United States Patent
Ng

(10) Patent No.: US 6,268,850 B1
(45) Date of Patent: *Jul. 31, 2001

(54) USER INTERFACE FOR THE SPECIFICATION OF LOCK GROUPS

(75) Inventor: Tony Chun Tung Ng, Fremont, CA (US)

(73) Assignees: Sun Microsystems, Inc., Palo Alto, CA (US); Baan Development, B.V. (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,212

(22) Filed: Jun. 29, 1998

Related U.S. Application Data

(60) Provisional application No. 60/068,415, filed on Dec. 22, 1997.

(51) Int. Cl.[7] .................................................. G06F 13/00
(52) U.S. Cl. ................................. 345/333; 707/8; 707/9; 345/968
(58) Field of Search ..................... 345/326, 333, 345/339; 707/3–9, 103, 101

(56) References Cited

U.S. PATENT DOCUMENTS

| | | |
|---|---|---|
| 4,589,092 | 5/1986 | Matick . |
| 5,043,876 | 8/1991 | Terry . |

(List continued on next page.)

FOREIGN PATENT DOCUMENTS

| | | | |
|---|---|---|---|
| 0 472 812 A1 | 2/1991 | (EP) | ................................. G06F/9/45 |
| WO 95/03586 | 2/1995 | (WO) | ............................. G06F/15/40 |
| WO 95/04960 | 2/1995 | (WO) | ............................. G06F/17/30 |
| WO 97/03406 | 1/1997 | (WO) | ............................. G06F/17/30 |

OTHER PUBLICATIONS

Fitsilis et al., "Producing Database Schemata from an Ogject Oriented Design", IEEE, pp. 251–257 (1994).
King, Nelson, "Java in the Database Server" (Jun. 1998), URL http://www.dbmsmag.com/9806d13.html, pp. 1–8.
T. Lindholm and F. Yellin, "The Java Virtual Machine Specification" Second Edition, Apr. 1999, pp. 1–473.
"Customizable Four Pane Layout for Database Table Definition," Dec. 1992, pp. 268–269.
H. Bank, "OQL," Sep. 15, 1997 (Rev. 0.11), pp. 1–7.
"Applications in Java and Extended Java," Sep. 28, 1998, pp. 1–21.
"Sun Simplifies Database Programming with Java Blend," Aug. 25, 1997, pp. 1–3.

(List continued on next page.)

*Primary Examiner*—Raymond J. Bayerl
*Assistant Examiner*—Tadesse Hailu
(74) *Attorney, Agent, or Firm*—Finnegan, Henderson, Farabow, Garrett & Dunner, L.L.P.

(57) ABSTRACT

A user interface permits a programmer or other person to manage lock groups for classes. The programmer enters information through the user interface to define new lock groups, update defined lock groups, and delete lock groups. The programmer manages the lock groups in the classes, and an optional mapping tool maps the defined lock groups when converting data between an object model and a relational model.

18 Claims, 10 Drawing Sheets

U.S. PATENT DOCUMENTS

| | | |
|---|---|---|
| 5,261,069 | 11/1993 | Wilkinson et al. . |
| 5,263,155 | 11/1993 | Wang . |
| 5,280,612 | 1/1994 | Lorie et al. . |
| 5,291,583 | 3/1994 | Bapat ........................................ 707/5 |
| 5,301,297 | 4/1994 | Menon et al. . |
| 5,504,885 | 4/1996 | Alashqur .................................. 717/5 |
| 5,542,078 | 7/1996 | Martel et al. ......................... 707/101 |
| 5,574,882 | 11/1996 | Menon et al. . |
| 5,596,746 | 1/1997 | Shen et al. ............................ 707/101 |
| 5,659,738 | 8/1997 | Letkeman et al. .................... 707/102 |
| 5,701,453 | 12/1997 | Maloney et al. ......................... 707/2 |
| 5,732,257 | 3/1998 | Atkinson et al. ......................... 707/4 |
| 5,742,813 * | 4/1998 | Kavanagh et al. ......................... 707/8 |
| 5,765,159 | 6/1998 | Srinivasan ............................ 707/102 |
| 5,774,731 | 6/1998 | Higuchi et al. . |
| 5,829,006 | 10/1998 | Parvathaneny et al. ............. 707/101 |
| 5,832,484 * | 11/1998 | Sankaran et al. ......................... 707/8 |
| 5,835,906 * | 11/1998 | Hagersten et al. ....................... 707/8 |
| 5,835,910 | 11/1998 | Kavanagh et al. . |
| 5,850,544 | 12/1998 | Parvathaneny et al. ............. 707/101 |
| 5,857,197 | 1/1999 | Mullins ................................. 707/102 |
| 5,860,070 * | 1/1999 | Tow et al. ................................. 707/8 |
| 5,878,411 | 3/1999 | Burroughs et al. ....................... 707/4 |
| 5,878,419 | 3/1999 | Carter ...................................... 707/10 |
| 5,893,108 | 4/1999 | Scrinivasan et al. ................. 707/103 |
| 5,907,846 | 5/1999 | Berner et al. ......................... 707/103 |
| 5,933,824 * | 8/1999 | DeKoning et al. ....................... 707/8 |
| 5,937,402 | 8/1999 | Pandit ....................................... 707/4 |
| 5,937,409 | 8/1999 | Wetherbee ........................... 707/103 |
| 6,003,040 | 12/1999 | Mital et al. ........................... 707/103 |
| 6,009,428 | 12/1999 | Kleewein et al. ...................... 707/10 |
| 6,038,565 | 3/2000 | Nock .................................... 700/101 |
| 6,049,673 | 4/2000 | McComb et al. ....................... 717/11 |

OTHER PUBLICATIONS

S. Wang, "Improvement of Concurrency Control Within Object–Oriented Database Systems," 1990, IEEE, pp. 68–70.

S. Heiler and S. Zdonik, "Object Views: Extending the Vision," 1990 IEEE, pp. 86–93.

D. Agrawal, A. Bernstein, P. Gupta, and S. Sengupta, "Distributed Multi–Version Optimistic Concurrency Control for Relational Database," Mar. 1986, pp. 416–421.

X. Qian and L. Raschid, "Query Interoperation Among Object–Oriented and Relational Databases," Mar. 6, 1995, IEEE, pp. 271–278.

S. Gantimahapatruni and G. Karabatis, "Enforcing Data Depencencies in Cooperative Information Systems," May 12, 1993, IEEE, pp. 332–341.

IBM Technical Disclosure Bulletin, vol. 38, No. 01, Jan. 1995, FAST and Secure Stored Procedures for a Client/Server DBMS, pp. 79–82.

A. Alashqur and C. Thompson, "O–R Gateway: A System for Connecting C++ Application Programs and Relational Databases," Aug. 10, 1992, pp. 151–169.

R. Ahad and T. Cheng, Hewlett–Packard Journal 44 (1993) Jun. No. 3, "HP OpenODB: An Object–Oriented Database Management System for Commercial Applications," pp. 20–30.

TOPLink, "The Industry Standard for Persistence Product, A White Paper: The Object People", 1997.

IBM Technical Disclosure Bulletin, vol. 37, No. 08, Aug. 1994, "Automatically Revising Function Prototypes in C and C++ Implementations of System Object Model Classes," pp. 363–365.

C. Kleissner, "Enterprise Objects Framework, A Second Generation Object–Relational Enabler," Jun. 1995, pp. 455–459.

SQL Tutorial: Introduction to Structured Query Language, Version 3.63 (May 1998), URL http://w3.one.net/~jhoffman/sqltut.htm#Compound Conditions.

The JDBC Database Access API (Apr. 1998), URL http://java.sun.com/products/jdbc.

O'Brien, Stephen K., "Turbo Pascal 5.5: The Complete Reference", Osborne/McGraw–Hill (1989), pp. 500–522.

Gosling, Joy, and Steele, "The Java™ Language Specification", Addison–Wesley (1996).

Hamilton, Cattell, and Fisher, "JDBC Database Access with Java™", Addison–Wesley (1997).

R.G.G. Cattell et al., "Object Database Standard: ODMG 2.0", Morgan Kaufmann Publishers, Inc. (1997).

Campione, Mary and Kathy Walrath, "The Java™ Tutorial", Addison–Wesley 91996).

* cited by examiner

```
Class Customer {
    int Cust_id;
    str SSN;
    collection Orders_for_Customer;
    int      get_Cust_id ();
    void     set_Cust_id (int Cust_id);
    str      get_SSN ();
    void     set_SNN (str SSN);
    iterator getOrdersForCustomer();
    void     addOrdersForCustomer(Order O);
    void     removeOrdersForCustomer(Order O);
}
```
⤴ 420

```
Class Order {
    int Order_id;
    str Date;
    Customer Customer_for_Order;
    int      get_Order_id ();
    void     set_Order_id (int Order_id);
    str      get_date ();
    void     set_date (str date);
    Customer getCustomerForOrder();
    void     setCustomerForOrder(Customer c);
}
```
⤴ 424

USER INTERFACE FOR THE SPECIFICATION OF LOCK GROUPS

REFERENCE TO RELATED APPLICATIONS

The following identified U.S. patent applications are relied upon and are incorporated in their entirety by reference in this application as if fully set forth.

Provisional U.S. patent application No. 60/068,415, entitled "System and Method for Mapping Between Objects and Databases," filed on Dec. 22, 1997.

U.S. patent application Ser. No. 09/106,186, entitled "Object Relational Mapping Tool That Processes Views," and filed on the same date herewith.

U.S. patent application Ser. No. 09/106,189, entitled "Evolution Of Object-Relational Mapping Through Source Code Merging," and filed on the same date herewith.

U.S. patent application Ser. No. 09/105,957, entitled "Integrating Both Modifications to an Object Model and Modifications to a Database into Source Code by an Object-Relational Mapping Tool," and filed on the same date herewith.

U.S. patent application Ser. No. 09/106,212, entitled "User Interface for the Specification of Lock Groups," and filed on the same date herewith.

U.S. patent application Ser. No. 09/106,119, entitled "A Fine-Grained Consistency Mechanism for Optimistic Concurrency Control Using Lock Groups," and filed on the same date herewith.

U.S. patent application Ser. No. 09/106,211, entitled "User Interface for the Specification of Index Groups Over Classes," and filed on the same date herewith.

U.S. patent application Ser. No. 09/106,188, entitled "Method and Apparatus for Creating Indexes in a Relational Database Corresponding to Classes in an Object-Oriented Application," and filed on the same date herewith.

U.S. patent application Ser. No. 09/106,190, entitled "Method and Apparatus for Loading Stored Procedures in a Database Corresponding to Object-Oriented Data Dependencies," and filed on the same date herewith.

U.S. patent application Ser. No. 09/106,046, entitled "An Integrated Graphical User Interface Method and Apparatus for Mapping Between Objects and Databases," and filed on the same date herewith.

U.S. patent application Ser. No. 09/234,311, entitled "Methods and Apparatus for Efficiently Splitting Query Execution Across Client and Server in an Object-Relational Mapping," and filed on the same date herewith.

FIELD OF THE INVENTION

The present invention relates to a user interface for specifying and managing lock groups for data stored in a database.

BACKGROUND OF THE INVENTION

Object-relational mapping tools facilitate development of application programs that utilize a relational database. A relational database stores data in tables having rows (records) and columns (fields). The tables are usually interrelated, and thus, there is a logical structure imposed on the database. This logical structure is known as a schema. Each table has a primary key, comprising one or more columns that uniquely identify a row. For example, in a table with rows of customers, a column storing each customer's social security number may be used as the primary key because it uniquely identifies each customer in the table. A table may also have another key, known as a foreign key, associating a row in one table to one or more rows in another table. For example, where one table contains customer information and another table contains order information for the customers, a foreign key may exist to relate one customer (or row) in the customer table with one or more orders (or rows) in the order table.

Object-relational mapping tools read a database and automatically generate source code from the database. This source code contains a number of classes whose interrelationships reflect the logical structure, or schema, of the database. A class, such as a Java™ class, is a data structure containing both data members that store data and function members (or methods) that act upon the data. The source code contains one class for each table in the database, and each class has a data member for each column in the corresponding table. Additionally, the classes contain function members that are used to both get and set the values for the data members and, eventually, update the database.

By using an object-relational mapping tool, a programmer can automatically generate source code to facilitate their database application development. After the source code is generated, the programmer writes code to interact with the classes in the source code and not the database, thus hiding the complexities of interacting with the database from the programmer. This allows a programmer who is familiar with object-oriented programming to code against familiar classes and not unfamiliar, sometimes cumbersome to use, database query languages.

Conventional object-relational mapping tools, however, do not enable users to specify lock groups based on classes mapped from tables in a relational database. A need therefore exists for a mapping tool with this capability.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 4B depicts source code generated from the object model depicted in FIG. 4A;

SUMMARY OF THE INVENTION

Apparatus and methods consistent with the present invention provide a user interface to allow a programmer or other person to view and enter information relating to lock groups, potentially for use with a mapping tool that maps corresponding data between a relational model and an object model.

A method consistent with the present invention provides a user interface having information representing lock groups for a class structure. Information representing one or more of the lock groups is selectively displayed through the user interface.

Another method consistent with the present invention provides a user interface having information representing data in a database and receives through the user interface information for defining a lock group associated with the data. The defined lock group is stored for use in processing associated with the data.

An apparatus consistent with the present invention provides a user interface having information representing lock groups for a class structure. The apparatus selectively displays through the user interface information representing one or more of the lock groups.

Another apparatus consistent with the present invention provides a user interface having information representing data in a database and receives through the user interface information for defining a lock group associated with the data. The apparatus stores the defined lock group for use in processing associated with the data.

DETAILED DESCRIPTION

Methods and systems consistent with the present invention provide a user interface for a programmer or other person to specify lock groups among classes of objects potentially mapped from a relational database. The interface may also be used to modify or delete existing lock groups. A mapping tool can map the lock groups during mapping of data between objects in an object-oriented model and tables in a relational model and, therefore, a user's specified lock groups are saved and need not be repeatedly recreated.

Overview of Mapping Tool

In accordance with methods and systems consistent with the present invention, the improved object-relational mapping tool maps a database by first querying the database to determine its schema and then by creating an internal data structure (known as the "database data structure") representing that schema. From this data structure, the object-relational mapping tool creates an object model containing all of the information necessary to generate classes and then creates source code containing a number of Java classes that may be used by a programmer to interface with the database.

Implementation Details

Figure 1:
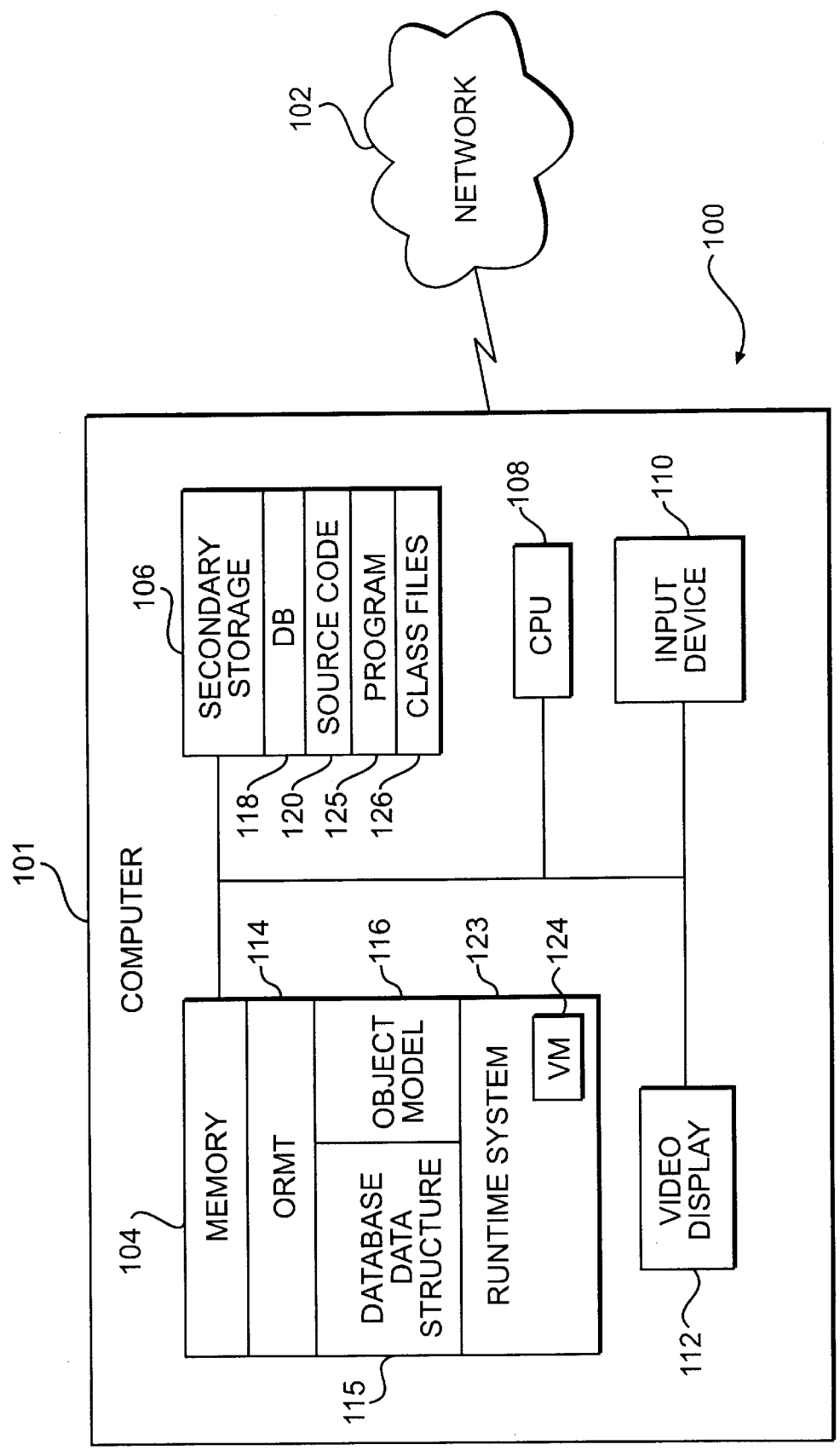
FIG. 1 depicts a data processing system suitable for practicing methods and systems consistent with the present invention.

FIG. 1 depicts a data processing system 100 suitable for practicing methods and systems consistent with the present invention. Data processing system 100 includes computer 101 connected to a network 102 such as the Internet. Computer 101 includes memory 104, secondary storage device 106, central processing unit (CPU) 108, input device 110, and video display 112. Memory 104 includes an object-relational mapping tool 114 (ORMT) in accordance with methods and systems consistent with the present invention. In turn, the object-relational mapping tool 114 includes object model 116 and database data structure 115, reflecting the schema of database 118, stored on secondary storage device 106. Also stored on secondary storage device 106 is source code 120, containing classes reflecting the schema of database 118 and containing any customizations of the programmer.

Memory 104 also includes a runtime system 123, which includes a virtual machine (VM) 124. Secondary storage device 106 further contains a program 125 with source code and various class files 126. An exemplary runtime system for purposes of implementing methods and systems consistent with the principles of the present invention includes the Java™ runtime system included in the Java™ Development Kit from Sun Microsystems, Inc. The Java runtime system includes a Java VM. The Java VM is described in Lindholm and Yellin, *The Java™ Virtual Machine Specification*, Addison-Wesley (1997), which is incorporated herein by reference.

Although computer 101 is depicted with various components, one skilled in the art will appreciate that this computer can contain additional or different components. Additionally, although computer 101 is shown connected to network 102, computer 101 may be connected to other networks, including other wide area networks or local area networks. Furthermore, although aspects of the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet; or other forms of RAM or ROM. Still further, one skilled in the art will appreciate that database 118 and source code 120 may be stored on or distributed across other devices on network 102. In addition, the computer-readable media may include instructions for controlling a computer systems, such as computer 101, to perform a particular method.

Sun, Sun Microsystems, the Sun logo, Java™, and Java™-based trademarks are trademarks or registered trademarks of Sun Microsystems, Inc. in the United States and other countries.

Object-relational mapping tool 114 reads database 118 to examine its schema, constructs database data structure 115 to reflect this schema, generates an object model 116 based on database data structure 115, and then creates source code 120 based on object model 116. It should be noted that, at the time object model 116 is generated, the object-relational mapping tool allows the programmer to add customizations, and these customizations will be reflected in the source code 120. For example, the programmer may add a new method, rename a field (and use it for a different purpose), change the attributes of a field (e.g., the type or whether it can accept a null value), or override the mapping of a field. When a field mapping is overridden, that field will not appear in the source code.

Figure 2:
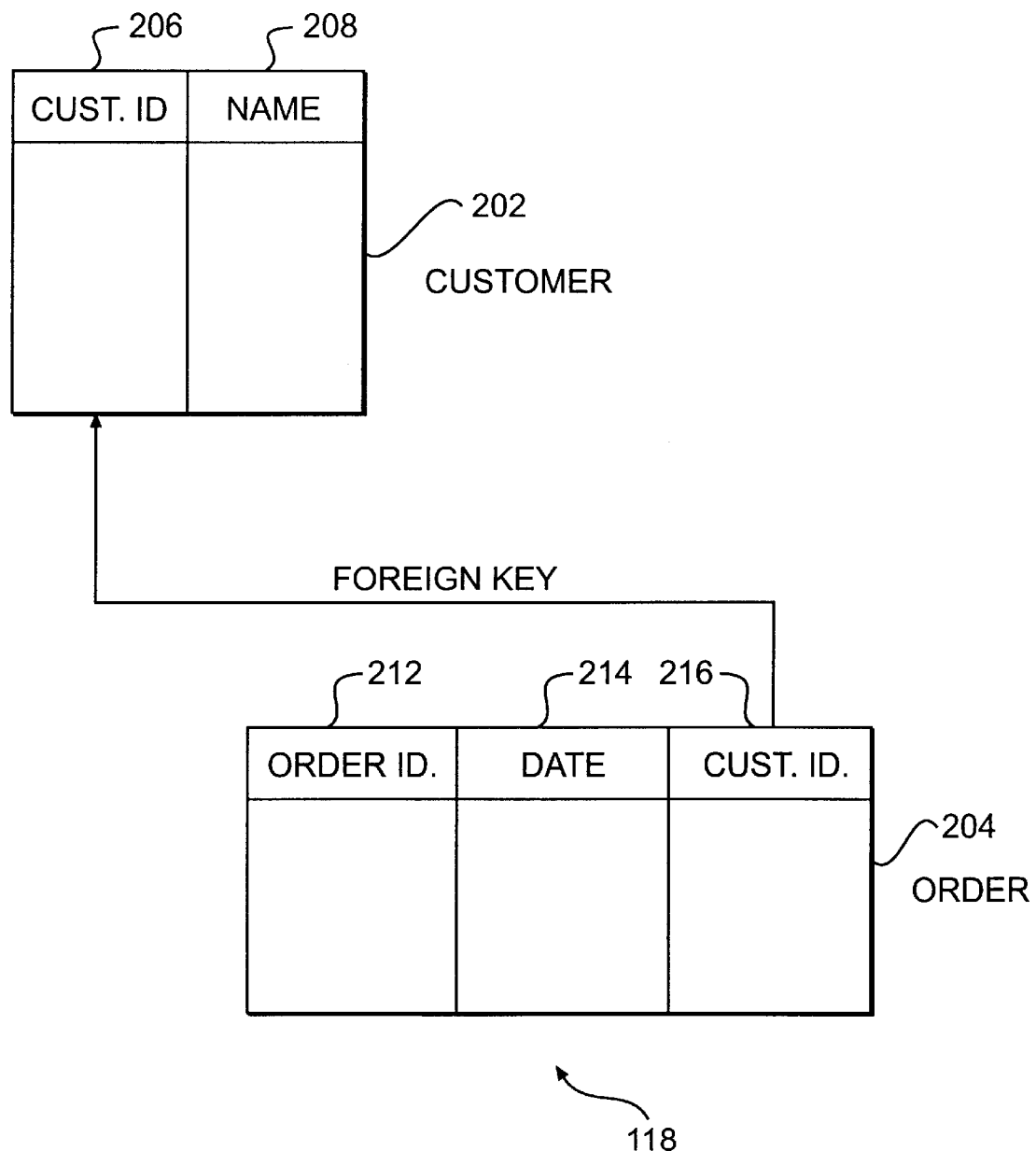
FIG. 2 depicts a more detailed diagram of the database depicted in FIG. 1.
Figure 3:
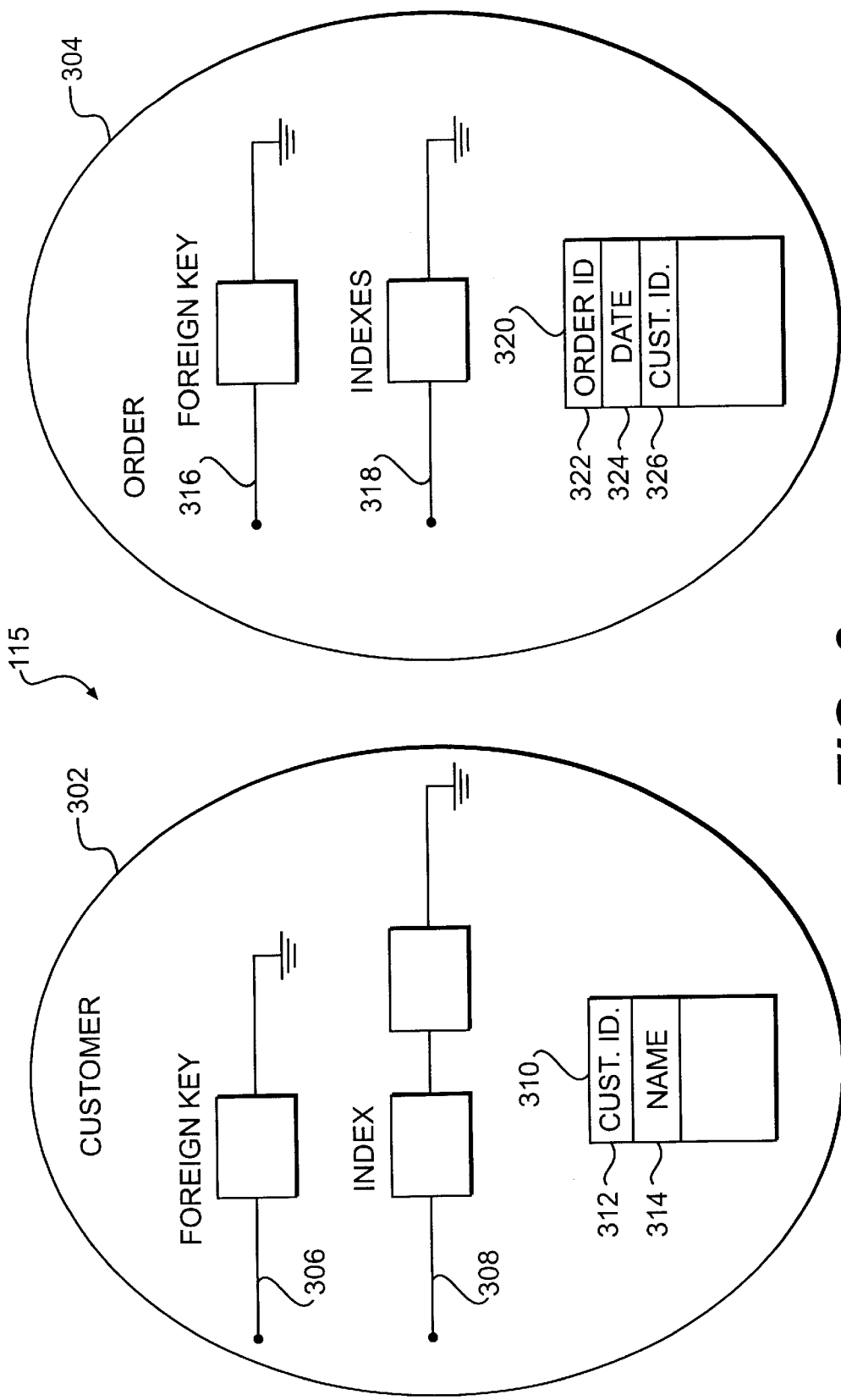
FIG. 3 depicts a database data structure reflecting the schema of the database depicted in FIG. 1.

FIG. 2 depicts a more detailed diagram of an example of database 118, containing a customer table 202 and an order table 204. The customer table 202 includes a customer ID column 206, and a name column 208. The customer ID column 206 serves as the primary key for the customer table 202. The order table 204 includes order ID column 212, date column 214, and customer ID column 216. The order ID column 212 serves as the primary key for the order table 204. Customer ID column 216 is the foreign key to customer ID column 206, meaning customer ID column 216 refers to the customer ID column 206 in one or more rows. As previously stated, database data structure 115 represents the schema of database 118. Object-relational mapping tool 114 creates database data structure 115 by querying database 118 to identify its schema and by creating the data structure to reflect the schema. This process is known as "importing" the database schema and is described in further detail below. Once created, database data structure 115 appears as shown in FIG. 3 and includes an object 302, reflecting the customer table 202, and an object 304, reflecting the order table 204. Object 302 contains a list 306 of foreign key objects, if any, each containing the name of the foreign key as well as an indication of the columns that comprise the foreign key. Additionally, object 302 contains a list 308 of the indexes in the customer table 202, where each element of the list is an index object containing an indication of the type of index (e.g., primary, non-unique, and unique) and a list of columns that comprise the index. Object 302 also contains a hash table 310, where each entry in the hash table is a column object 312, 314 containing data for a particular field, including its name, type, and length. Object 304 contains similar information, including a list of foreign keys 316, a list of indexes 318, and a hash table 320 with column objects 322–326 for each field or column.

Figure 4A:
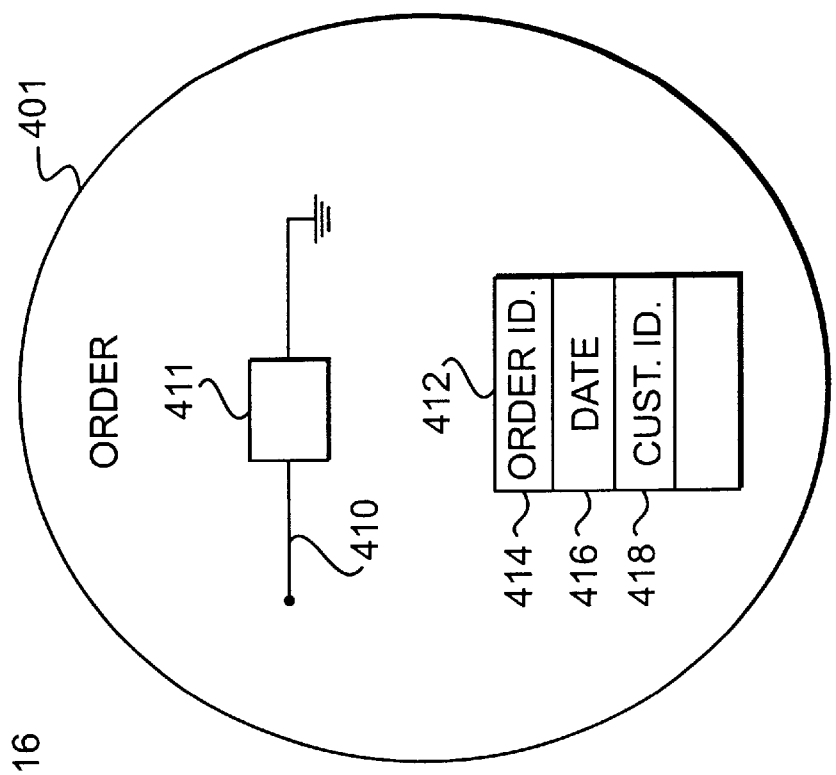
FIG. 4A depicts an object model containing information derived from the database data structure depicted in FIG. 3.
Figure 4A:
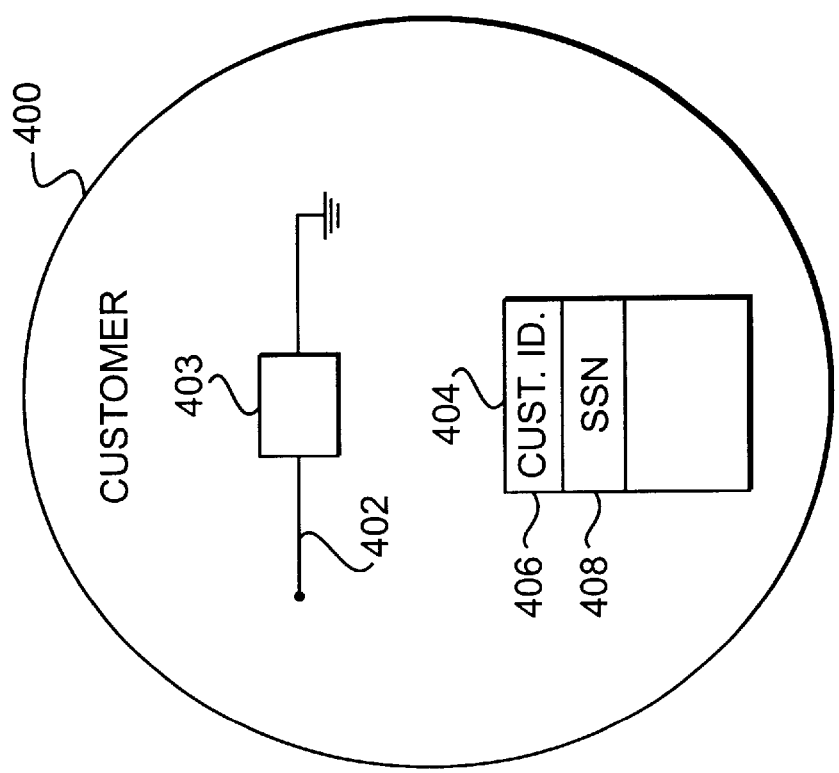

Using the object-relational mapping tool, the programmer may customize the object model. For example, the programmer may rename the name field to SSN and may subsequently use this field to store the customer's social security number, in which case the customer's social security number will be stored in the name field 208 of the database 118. By making such a customization, it is reflected in the object model 116 shown in FIG. 4A. Object model 116, generated by the object-relational mapping tool, contains the programmer's customization (e.g., the name field has been renamed to SSN). Object model 116 contains objects 400 and 401, representing an intermediate form of the information for a class before it is written as source code. Object 400 contains information for the customer table 202, including a list 402 of relationship objects 403, each containing information indicating a relationship (i.e., a foreign key). For example, relationship object 403 links a field in object 400 with a field in object 401. Additionally, object 400 contains a hash table 404 with an entry 406, 408 for each field in customer table 202, each entry containing the name and type of the field. Similarly, object 401 contains information for order table 204, including a list 410 of relationship objects 411 and a hash table 412 containing entries 414–418 for each field in order table 204.

As can be appreciated from this description of object model 116, it contains all of the information necessary to create the classes in the source code, an example of which is depicted in FIG. 4B. FIG. 4B depicts source code file 116 with the Java™ programming language representation of objects 400 and 401. Class 420 reflects customer table 202 and class 424 reflects order table 204. As such, class 420 contains a data member for customer ID, social security number, and a collection of objects representing the orders associated with that particular customer, thus implementing the foreign key. Class 420 also contains a number of methods to both get and set the value of the data members, including an iterator method to iterate through the order for this particular customer. Class 424 includes data members order ID and date and also includes various methods to both set and get the values for these data members. Additionally, class 424 contains a field, Customer_for_Order, implementing the foreign key with a reference to the particular customer object that placed that order.

When a foreign key is contained in the object model, the object-relational mapping tool typically creates a relationship in the source code between two classes to implement the foreign key. As stated above, with a foreign key, one or more records in one table (the referring table) refers to one record in another table (the referred table). This relationship is a one-to-many relationship, although it may be a one-to-one relationship. Additionally, instead of being bidirectional, the relationship may be unidirectional. To define this relationship in the Java™ programming language, the class representing the referring table is defined to have a member that is a collection of the class representing the referred table. A "collection" refers to a type indicating a grouping of instances of other classes. Then, in the class reflecting the referred table, a member is added providing a reference to the class that refers to it. For most cases, this is how a foreign key is implemented. However, when the foreign key for two tables overlaps with the primary key for those tables, it is more efficient to simply subclass the class reflecting the referred class from the class reflecting the referring class.

Lock Groups

Figure 5:
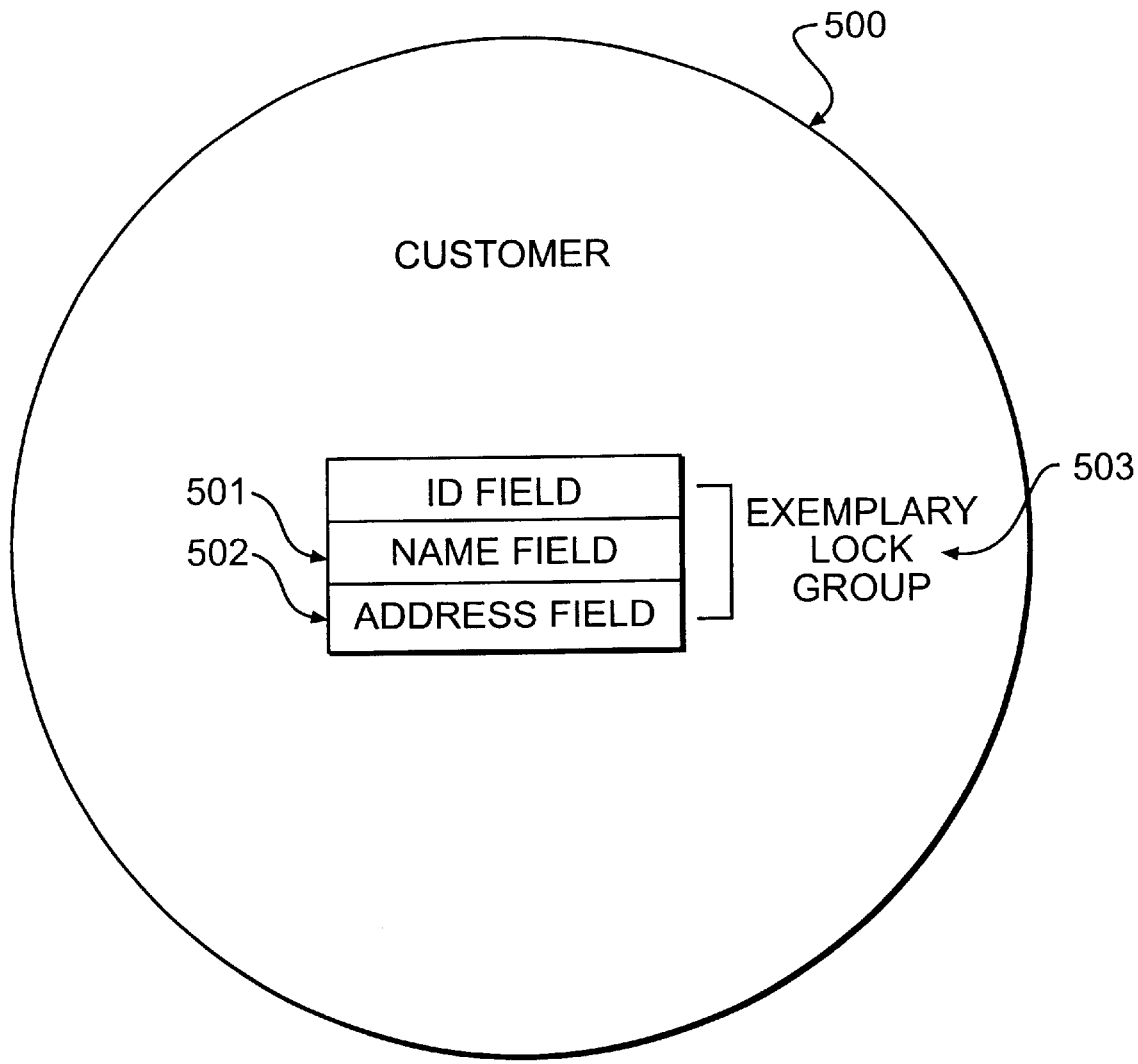
FIG. 5 is a diagram of an exemplary lock group for an object in a class.

A lock group specifies one or more fields of a class for an object model of data stored in a database for use by a system in avoiding conflicts that may arise when updating the database. The object model may be mapped from a relational model of the data. FIG. 5 shows an example of a customer object 500 in an object model having a name field 501 and an address field 502. An exemplary lock group 503 is shown as including name field 501 and address field 502. With this lock group defined, only one user may modify data in the name and address fields during a transaction.

A system managing a database for which object 500 is defined uses exemplary lock group 503 to determine conflicts among applications processing data in the database. For example, when an application performs a transaction modifying data in object 500, including data in fields 501 or 502, and attempts to commit the transaction to save the modifications, a system determines if any other application modified data in fields 501 and 502. The system does not commit the transaction and modify the database if another application made modifications.

Lock groups are applicable, for example, to optimistic concurrency control with respect to applications updating a database. Under optimistic concurrency control, a system does not prevent access to fields in object; in other words, it does not lock out an application from accessing fields while another application may access those same fields. Rather, it typically permits applications to access any field in objects and uses lock groups to determine conflicts when an application commits data changes. Conflicts involve two or more applications attempting to modify and commit changes to the same field or set of fields. In comparison, under pessimistic concurrency control, a system avoids conflicts by locking out particular fields or a set of fields when an application accesses them, prohibiting other applications from updating the locked fields.

Lock group 503 is only one example of a lock group for fields in a class corresponding to an object model. Lock groups may typically include any number of fields in an object or fields among multiple objects. A default lock group will typically include all fields within an object. Therefore, allowing a user to define lock groups as fewer than all fields permits more narrowly defining what constitutes a conflict, permitting simultaneous access to data in an object and hence increasing data processing capability.

User Interface for Managing Lock Groups

An implementation consistent with the present invention relates to a user interface for specifying and managing lock groups within a database. A "user interface" refers to a mechanism to view a representation of information in a computer system, such as computer 10 1, and to enter information into the computer system. The input information may include commands instructing the computer to perform a particular function.

Figure 6:
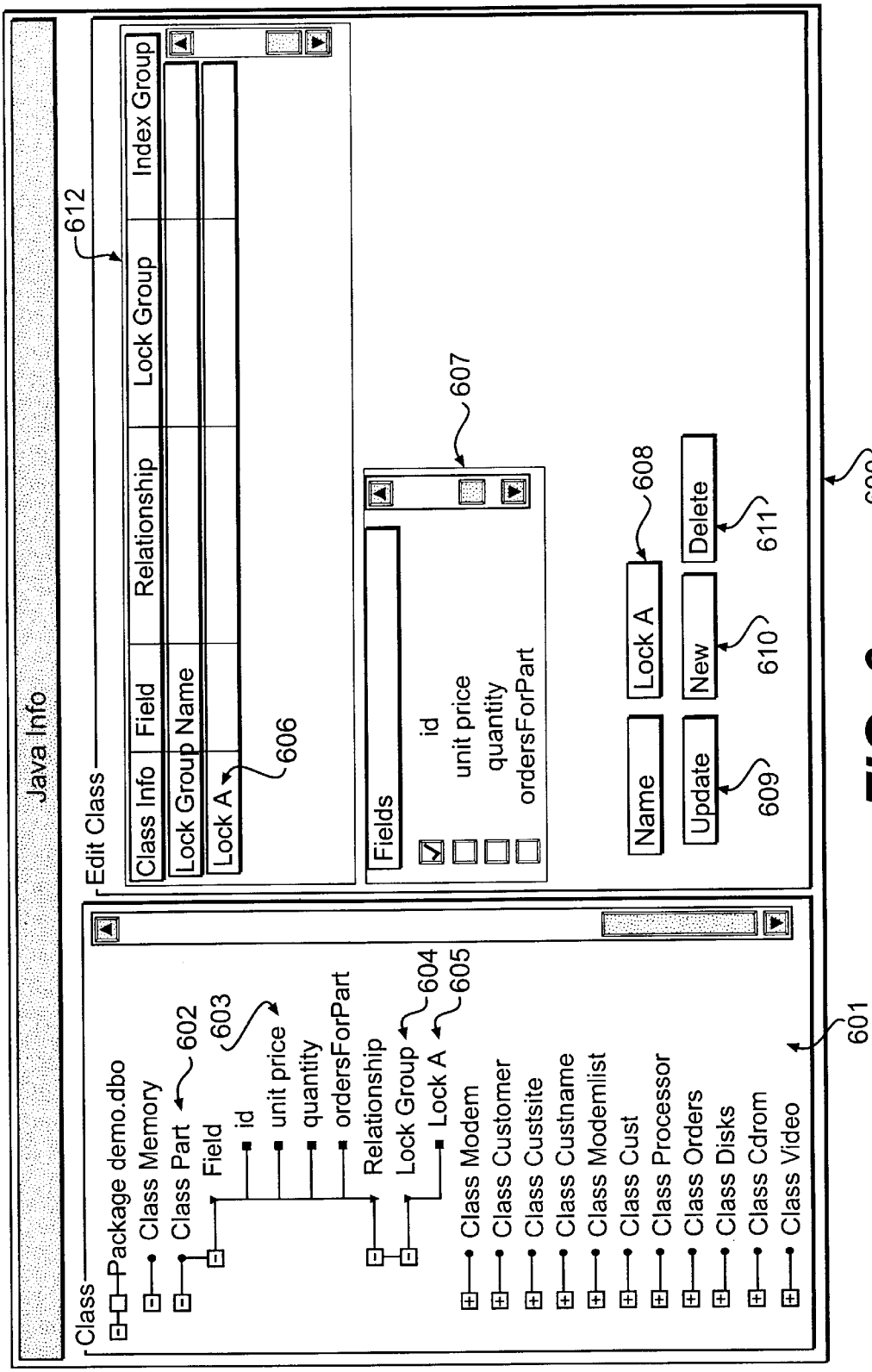
FIG. 6 is an example of an user interface for defining lock groups for classes mapped from tables.

FIG. 6 illustrates an example of such a user interface 600. Video display 112 may present user interface 600 in order to permit a user to view information relating to lock groups, and a user may use input device 110, such as a cursor-control device, to enter or modify information through user interface 600. Lock groups defined through user interface 600 are typically stored in computer 101 such as in memory 104 or secondary storage 106. The appearance and structure of user interface 600 are only one such example of a user interface for accomplishing functions relating to lock groups, and implementations consistent with the present invention include any mechanism to display and enter information relating to lock groups.

When a user selects lock group button 612, the user may enter and define lock groups for particular classes, shown in a section 601. A "section" refers to an area of a user interface in which a system presents information or receives information from a user. The act of selecting may include using a cursor-control device to "click on" or "double click on" a particular item in the user interface. User interface 600 includes section 601 in order to illustrate fields of a particular class representing data in a database. A user may select the boxes next to the classes in order to expand the listing and view information related to each class, including fields of the class and lock groups defined for the class. For example, a class Part 602 is shown as having a number of fields 603 and as associated with one or more lock groups 604. In this example, one lock group 605 is defined for class Part, lock A 605. When a user selects lock A 605, a section 606 presents the corresponding lock group and a section 607 presents the fields of class Part 602. A user may select other classes in section 601 in a similar manner, and fields for those classes are also presented in section 607 when corresponding classes are selected. Sections 606 and 607 include scroll bars so that a user may scroll through lock groups or fields if there is insufficient room to illustrate all the lock groups or fields within the section.

A user may perform functions on lock groups by selecting buttons 609–611. In particular, by selecting update button 609, a user may update a defined lock group, and by selecting new button 610, a user may define and enter a new lock group. In order to update a lock group or define a new lock group, a user selects the boxes next to the particular fields in section 607 in order to select or deselect those fields to include within the lock group shown in section 606. When a user selects or "clicks on" a field or the box next to it, a check mark appears in the box next to the field in section 607 to indicate its selection. When a user "clicks on" the field again, or the box next to it, to deselect the field, the check mark disappears, indicating deselection of the corresponding field. Other types of indicators are possible for showing selection of a field, such as highlighting the field, displaying the field within a box or in a different color, or displaying some other type of icon next to the field.

In section 608, a user may enter a name of a new lock group or modify the name of a defined lock group, and the entered name is shown in section 606. When a user selects update button 609, the system saves the new lock group or updates a defined lock group according to the user's selections, and the new or updated lock group is saved in the system and presented within section 601 for the corresponding class.

By selecting delete button 611, a user may delete a defined lock group. In particular, a user first selects a lock group in section 601 and then selects delete button 611, after which the system deletes that defined lock group and removes it from section 601.

Lock Group Modules

Figure 7:
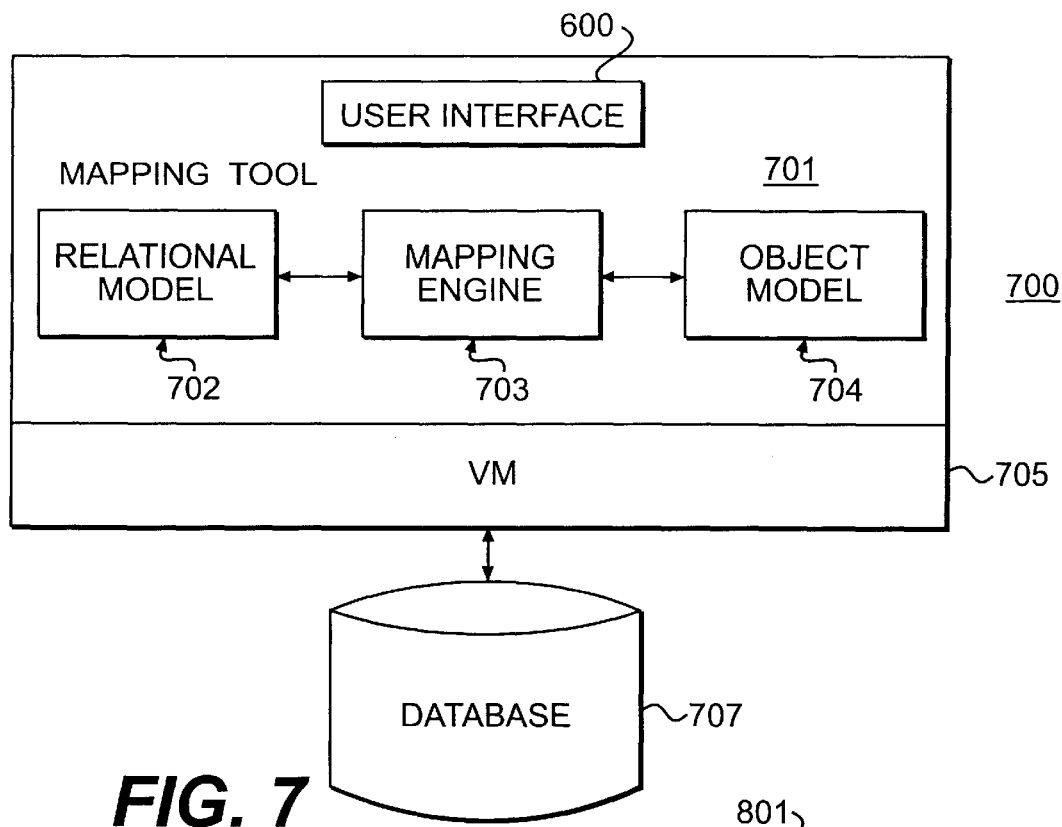
FIG. 7 is a block diagram of software modules for accessing and operating on data using lock groups.

FIG. 7 is a block diagram of software modules for implementing the exemplary user interface shown in FIG. 6. These modules may operate within the hardware elements shown in FIG. 1. In system 700, user interface 600 is typically part of a mapping tool 701 such as ORMT 114. Mapping tool 701 includes a relational model 702, an object model 704, and a mapping engine 703 for converting data between the relational model and the object model. Relational model 702 stores a representation of data from database 707 in tables, and object model 704 stores a representation of the data in objects. Relational model 702 may correspond to database data structure 115, and object model 704 may correspond to object model 116. Mapping tool 701 interacts with VM 705, which may correspond to VM 124. System 700 is connected to a database 707 for storing data in relational form, and database 707 may correspond to database 118.

A user operating with user interface 600 interacts with mapping tool 701 in order to enter and define the lock groups. Mapping engine 703 converts data between relational model 702 and object model 704, and may perform the mapping using the exemplary mapping tool described above. In performing the conversions, mapping engine 703 uses lock groups defined through interface 600 in order to map the lock groups between the relational and object models. The user-entered definitions of lock groups may be saved, such as in memory 104 or secondary storage 106, and the system may associate the saved lock groups with the corresponding classes according to known methods. Furthermore, user interface 600 need not necessarily be used with a mapping tool and may, alternatively, be used in general to specify lock groups on a database.

Figure 8:
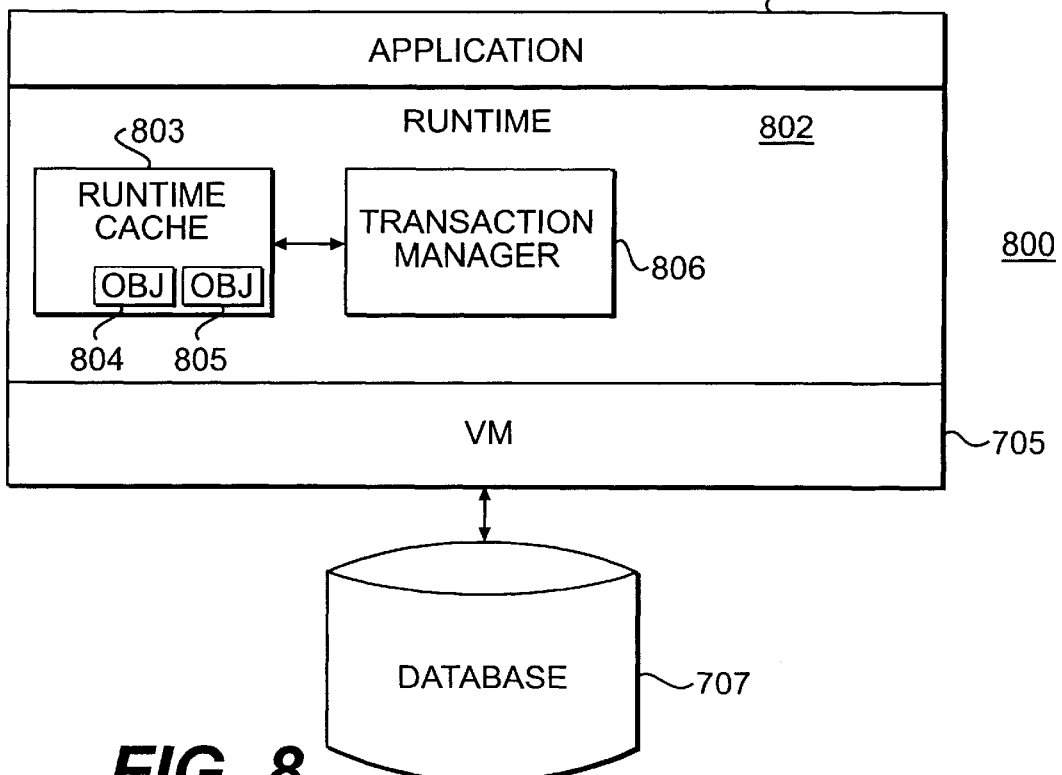
FIG. 8 is a diagram of software modules for processing transactions on data using associated lock groups.

FIG. 8 is a block diagram of software modules including a runtime illustrating the operation of applications on data within a database. These modules may operate within the hardware elements shown in FIG. 1. System 800 includes one or more applications 801 performing transactions on data within database 707. Application 801 interacts with a Java runtime 802, which may correspond to runtime 123 and includes a runtime cache 803 storing one or more objects 804 and 805 and a transaction manager 806. Runtime 802 also interacts with VM 705. System 800 may also accesses data in database 707.

Objects are generated in runtime cache 803 as required by application 801, which accesses and operates on data within the objects. When application 801 completes its transaction, it commits the transaction to transaction manager 806, which determines any conflicts. Transaction manager 806 tracks values of data elements in the database over time in order to determine the conflicts.

For example, Table 1 illustrates how transaction manager 806 may track values of data elements to determine conflicts. In this example, application 1 attempts to modify the value of a data element x. At time t1, the value of data element x is 5 and application 1 begins a transaction. At time t2, the value of data element x remains the same, but at time t3 application 2 begins a transaction and changes the value of data element x to 6. Application 2 commits the data at time t4, at which time the value of data element x is changed to 6 in the database, assuming no conflicts exist. At time t5, application 1 changes the value of data element x to 7 and attempts to commit the transaction.

TABLE 1

| time | application 1 | application 2 |
| --- | --- | --- |
| t1 | x = 5 | |
| t2 | | x = 5 |

TABLE 1-continued

| time | application 1 | application 2 |
|---|---|---|
| t3 | | x → 6 |
| t4 | | commit data |
| t5 | x → 7 (conflict) | |

Transaction manager 806 determines if a conflict exists by comparing before and after values of data element x. Transaction manager 806 recorded the value of data element x (=5) when application 1 began its transaction, and the system knows that application 1 intends to commit a value of 7 for data element x. Therefore, for no conflicts to exist, the before and after values of data element x must be 5 and 7. However, data element x now has a value of 6 in the database, and the before and after values are 6 and 7. Transaction manager 806 thus determines that the before and after values are incorrect when application 1 commits the transaction and it does not make the requested change to the value of data element x. The system thus records and tracks values of data elements when transactions begin in order to determine conflicts when application commit transactions, and other methods of determining conflicts are possible.

Lock Group Processing

Figure 9:
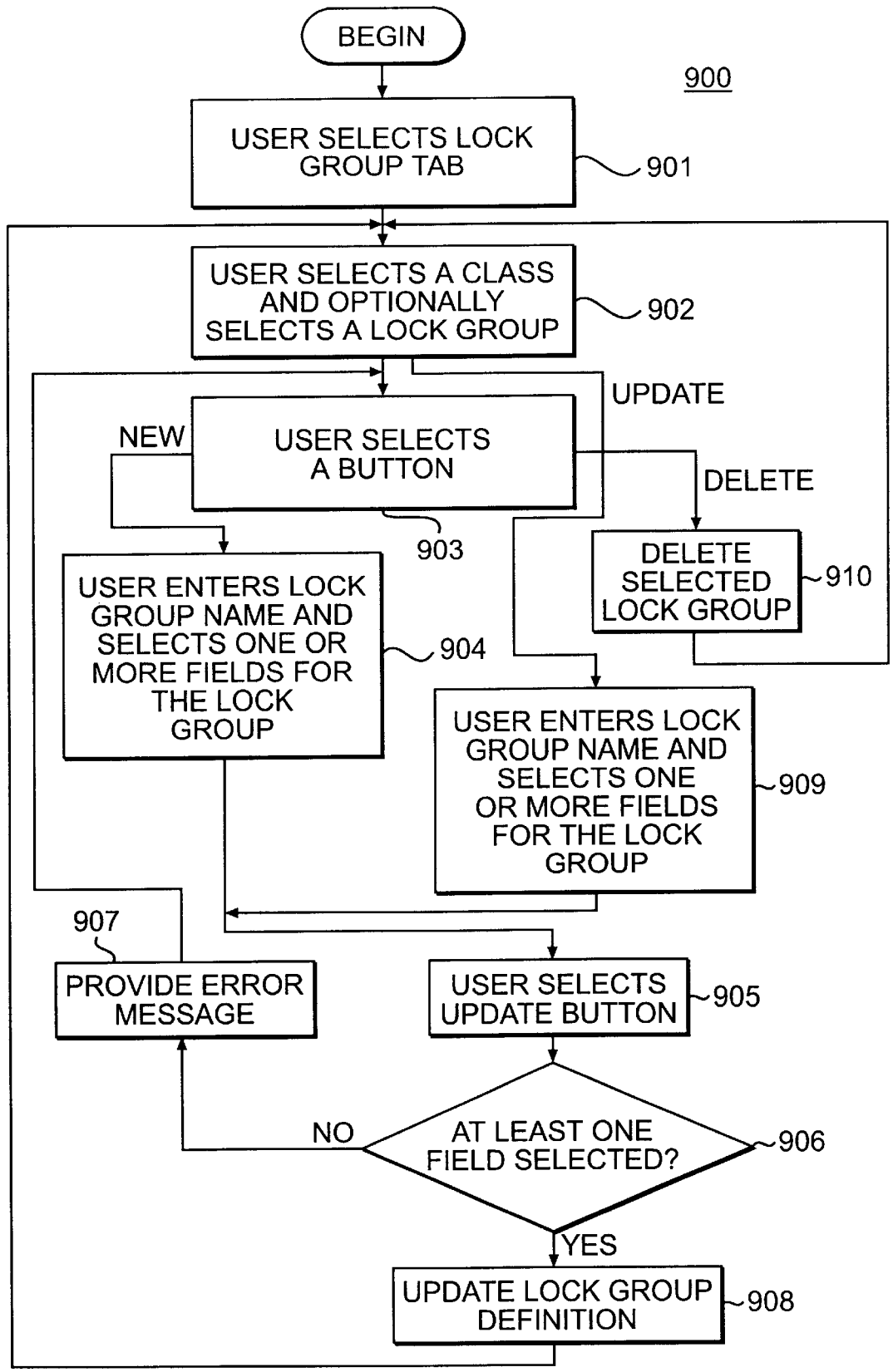
FIG. 9 is a flow chart illustrating exemplary processing associated with the user interface shown in FIG. 6.

FIG. 9 is a flow chart illustrating exemplary processing associated with user interface 600 shown in FIG. 6. This processing may be implemented by the modules shown in FIG. 7 operating within the hardware elements shown in FIG. 1. In process 900, a user first selects a lock group button 612 (state 901). The user then selects a class and optionally selects a lock group in section 601 (state 902). The user may select the class and lock group as shown in section 601 by selecting the appropriate box next to the class names. The user selects one of the buttons 609–611 in order to select a particular function (state 903).

If the user selected new button 610, the user enters the lock group name in section 608 and selects fields for the lock group in section 607 by selecting the boxes next to the field names (state 904). The user selects update button 609 in order to enter the defined new lock group (state 905), after which the system determines if at least one field is selected for the lock group (state 906). If no fields are selected, the system provides an error message (state 907), which may include presenting a section with a message indicating that at least one field must be selected. Otherwise, the system updates the lock group definition with the new information, stores the defined lock group, and includes a listing of it in section 601 (state 908).

To update a lock group, a user selects fields for the lock group using section 607 (state 909). When the user selects the update button, the lock group is updated in accordance with the field selection, if at least one field was selected (states 905–908). If the user selects delete button 611, the system deletes the lock group selected in state 902 (state 910) and shown in section 606.

Figure 10:
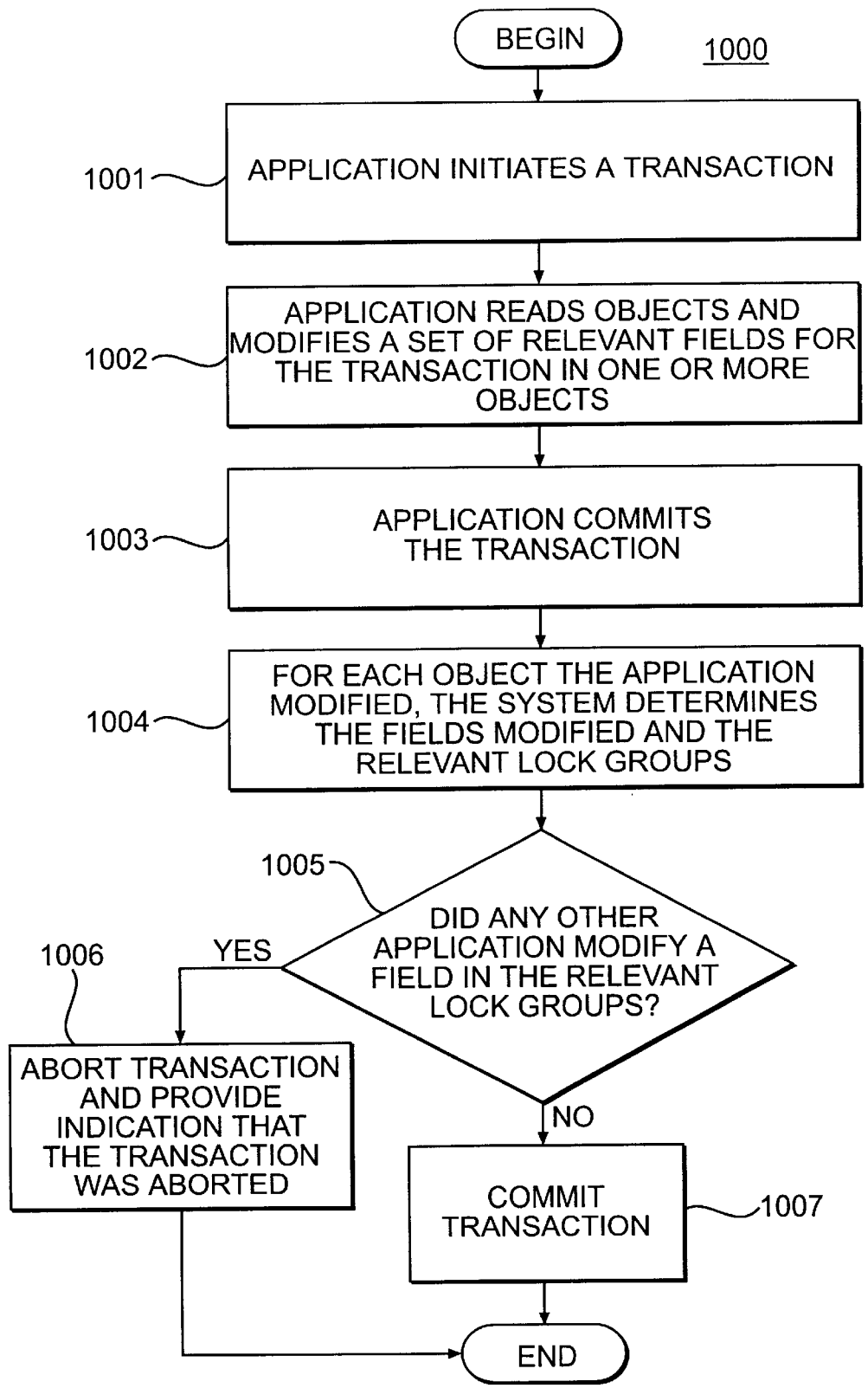
FIG. 10 is a flow chart illustrating exemplary processing associated with applications performing transactions on data in a database.

FIG. 10 is a flow chart of processing associated with the modules shown in FIG. 8 and involving processing by transaction manager 806. This processing may be implemented by the software modules shown in FIG. 8 operating within the hardware elements shown in FIG. 1. In process 1000, application 801 initiates a transaction (state 1001). Application 801 reads objects from runtime cache 803 and modifies a set of fields for the transaction in one or more of the objects (state 1002). Application 801 commits the transaction by interacting with transaction manager 806 (state 1003). As identified above, committing a transaction involves the application requesting that the system change data in a database according to modifications made by the application.

For each object application 801 modified, transaction manager 806 determines the fields modified and the relevant lock groups involved (state 1004). Transaction manager 806 determines if a conflict exists by determining if any other application modified a field within the relevant lock groups (state 1005), which it may accomplish by tracking data values as described above. If a conflict exists, transaction manager 806 aborts the transaction and typically provides an indication that the transaction was aborted, for example, by throwing an exception (state 1006), which may include informing the application that a conflict occurred and the requested changes were not entered. Otherwise, transaction manager 806 commits the transaction (state 1007) by updating the values of data elements in the database according to the changes made by application 801.

While the present invention has been described in connection with a preferred embodiment, many modifications will be readily apparent to those skilled in the art, and this application is intended to cover any adaptations or variations thereof. For example, other types of user interfaces and hardware for presenting the user interface, and other types of programming languages for implementing an embodiment consistent with the present invention, may be used without departing from the scope of the invention. This invention should be limited only by the claims and equivalents thereof.

What is claimed is:

1. A method of defining a lock group, comprising:
providing a user interface having information reflecting a class structure corresponding to data stored in at least one of a relational database and an object-oriented database; and
receiving information for defining a lock group associated with the class structure, wherein the information for defining a lock group includes an identification of particular fields of one or more classes within the class structure.

2. The method of claim 1 wherein receiving information for defining a lock group includes receiving a request to update the defined lock group.

3. The method of claim 1 wherein receiving information for defining a lock group includes receiving a request to delete the defined lock group.

4. An apparatus, comprising:
a memory having program instructions for permitting a user to view lock groups reflecting a class structure corresponding to data stored in at least one of a relational database and an object-oriented database; wherein the lock group is associated with particular fields of one or more classes within the class structure; and
a processor, responsive to the program instructions, to
provide a user interface having information reflecting the class structure of the lock group; and
selectively display information representing one or more of the lock groups associated with the class structure.

5. An apparatus, comprising:
a memory having program instructions for defining a lock group for a class structure corresponding to data stored in at least one of a relational database and an object-oriented database; and
a processor, responsive to the program instructions, to
provide a user interface having information reflecting the class structure of the lock groups; and receiving information for defining a lock group associated with the class structure of the data, wherein the information for defining a lock group includes an identification of particular fields of one or more classes within the class structure.

6. The apparatus of claim 5 wherein receiving information for defining a lock group includes receiving a request to update the defined lock group.

7. The apparatus of claim 5 wherein receive information for defining a lock group includes receiving a request to delete the defined lock group.

8. A computer-readable medium containing instructions for controlling a computer system to perform a method for permitting a user to view lock groups, the method comprising:

providing a user interface having information reflecting a class structure corresponding to data stored in at least one of a relational database and an object-oriented database; and selectively displaying through the user interface, information representing one or more of the lock groups, wherein the lock groups are associated with particular fields of one or more classes within the class structure.

9. A computer-readable medium containing instructions for controlling a computer system to perform a method for use in defining a lock group, the method comprising:

providing a user interface having information reflecting a class structure corresponding to data stored in at least one of a relational database and an object-oriented database; and receiving information for defining a lock group associated with the class structure; wherein the information for defining a lock group includes an identification of particular fields of one or more classes within the class structure.

10. The computer-readable medium of claim 9 wherein receiving information for defining a lock group includes receiving a request to update the defined lock group.

11. The computer-readable medium of claim 9 wherein receiving information for defining a lock group includes receiving a request to delete the defined lock group.

12. An apparatus for permitting a user to browse lock groups, comprising:

means for providing a user interface having information reflecting a class structure corresponding to data stored in at least one of a relational database and an object-oriented database; and means for selectively displaying through the user interface, information representing one or more of the lock groups, wherein the lock groups are associated with particular fields of one or more classes within the class structure.

13. A method of permitting a user to view lock groups for a class structure corresponding to data stored in a database, wherein the lock groups are associated with particular fields of one or more classes within the class structure, comprising:

providing a user interface having information representing the lock groups; and selectively displaying information representing one or more of the lock groups.

14. A method of processing transactions in a processing system employing lock groups for a class structure corresponding to data stored in a database, wherein the lock groups are associated with one or more fields of one or more classes within the class structure, the method comprising:

initiating, by a first application, a transaction for modifying one or more fields within a class;

committing the transaction by the first application;

determining any relevant lock groups associated with the one or more fields that were modified;

determining whether a conflict exists with the transaction based on the relevant lock groups; and aborting the transaction when it is determined that the transaction is associated with a conflict.

15. The method of processing transactions, according to claim 14, wherein determining whether a conflict exists further includes:

determining whether any other applications modified a field within any of the relevant lock groups.

16. The method of processing transactions, according to claim 15, wherein initiating by the first application, a transaction includes recording an initial value for each field before each field is modified and committed by the first application, and wherein determining whether any other applications modified the one or more fields within any of the relevant lock groups further includes:

determining a current value for each field within the relevant lock groups;

comparing, for each field associated with the relevant lock groups, the current value with the initial value recorded before the transaction was committed; and determining that a conflict exits for the transaction when the current value does not match the initial value for any field associated with the relevant lock groups.

17. A method of processing transactions in a processing system employing lock groups for a class structure corresponding to data stored in a database, wherein the lock groups are associated with one or more fields of one or more classes within the class structure, the method, performed by a transaction manager, comprising:

receiving a first transaction request from a first application to modify a value of a first field of a class object from a first value to a second value;

recording the first value of the first field;

receiving a second transaction request from a second application to modify the value of the first field to a third value;

committing the modification of the value of the first field to the third value;

changing, by the first application, the value of the first field to the second value; and aborting the first application's transaction request based on the comparison between the first value and the third value of the first field.

18. The method of claim 17, wherein the first and third values are not identical.

* * * * *